(12) United States Patent
Hilden

(10) Patent No.: US 8,838,360 B1
(45) Date of Patent: Sep. 16, 2014

(54) PNEUMATIC CHARGING SYSTEM AND METHOD

(76) Inventor: Daniel L. Hilden, Forest Lake, MN (US)

( * ) Notice: Subject to any disclaimer, the term of this patent is extended or adjusted under 35 U.S.C. 154(b) by 768 days.

(21) Appl. No.: 13/106,891

(22) Filed: May 13, 2011

(51) Int. Cl.
*G06F 17/00* (2006.01)

(52) U.S. Cl.
USPC .......................................................... 701/101

(58) Field of Classification Search
USPC ........................ 701/101, 102; 137/14, 565.17
See application file for complete search history.

(56) References Cited

U.S. PATENT DOCUMENTS

| | | | | | |
|---|---|---|---|---|---|
| 3,498,343 | A | * | 3/1970 | Sperberg | 141/311 R |
| 4,052,024 | A | * | 10/1977 | Smith | 244/3.21 |
| 4,068,468 | A | * | 1/1978 | Wood et al. | 60/787 |
| 4,553,907 | A | * | 11/1985 | Heger et al. | 417/297 |
| 6,510,736 | B1 | * | 1/2003 | Van Ee | 73/302 |

* cited by examiner

*Primary Examiner* — Hieu T Vo
(74) *Attorney, Agent, or Firm* — Dave Alan Lingbeck

(57) ABSTRACT

A pneumatic charging system and method for re-pressurizing at selected pressures air tanks used to actuate pneumatic motors. The pneumatic charging system and method includes a pneumatic tank being connected to a pneumatic motor; and a gas generating chamber being in fluid communication with the pneumatic tank to generate pressurized gas for actuating the pneumatic motor.

18 Claims, 3 Drawing Sheets

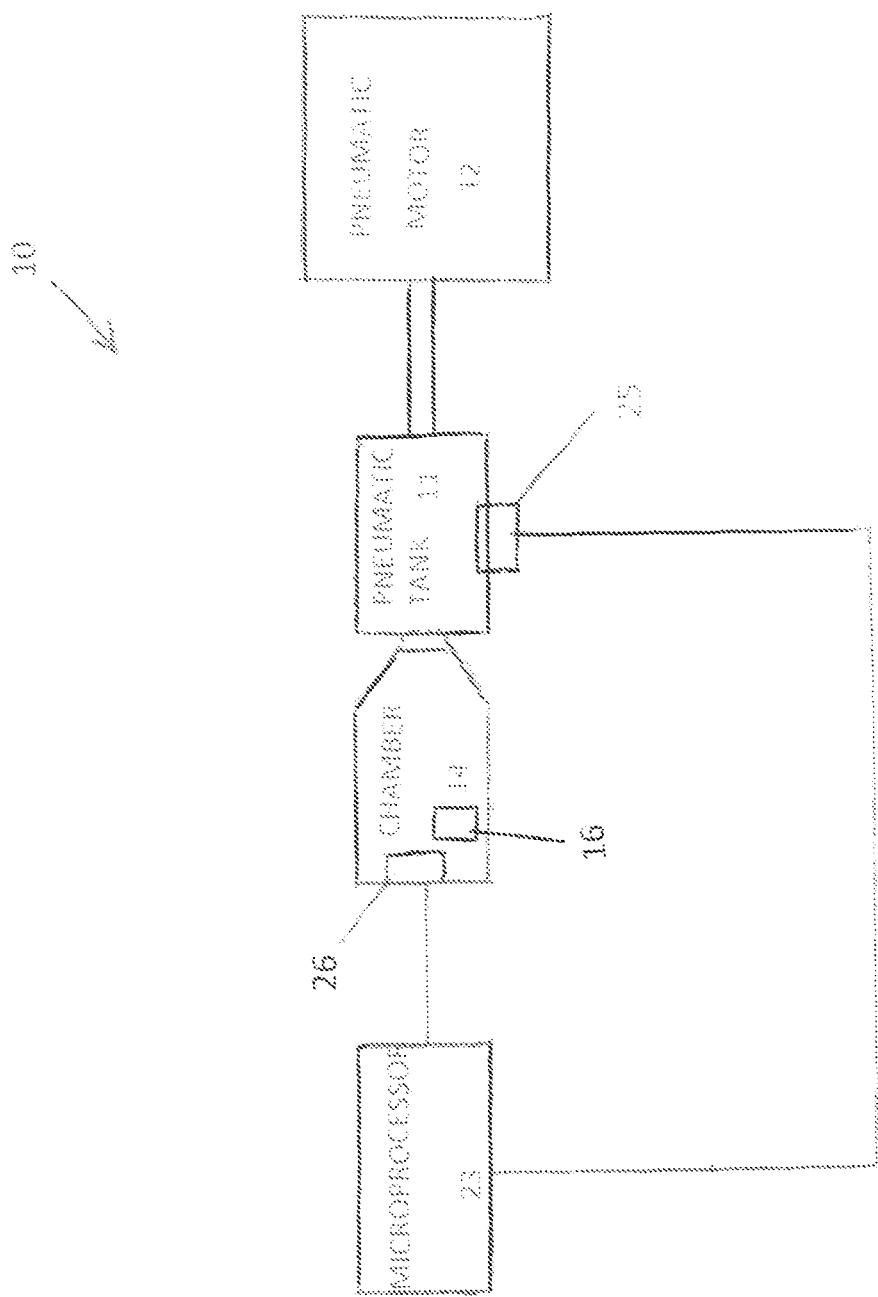

PNEUMATIC CHARGING SYSTEM AND METHOD

BACKGROUND OF THE INVENTION

1. Field of the Invention

The present invention relates to gas generators and more particularly pertains to a new pneumatic charging system and method for re-pressurizing at selected pressures air tanks used to actuate pneumatic motors.

2. Description of the Prior Art

The use of gas generators is known in the prior art. More specifically, gas generators heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a method of charging pressurized gas using a pressurized gas chamber, a gas generating chamber, a gas generating agent disposed in the gas generating chamber and also an igniter. Also, another prior art includes filling a pressure vessel with highly pressurized gas using a liquefied natural gas and permitting the temperature of the liquid to rise in the tank to vaporize it into a gas under pressure. Another prior art includes a device for pressurizing a propellant tank feeding the combustion members of a space vehicle with a propellant becoming decomposable. Yet, another prior art includes a gas generator comprising two generator stages and includes an igniter, at least one propellant charge and a combustion chamber. While these devices fulfill their respective, particular objectives and requirements, the aforementioned patents do not disclose a new pneumatic charging system and method.

SUMMARY OF THE INVENTION

The general purpose of the present invention, which will be described subsequently in greater detail, is to provide a new pneumatic charging system and method which has many of the advantages of the gas generators mentioned heretofore and many novel features that result in a new pneumatic charging system and method which is not anticipated, rendered obvious, suggested, or even implied by any of the prior art gas generators, either alone or in any combination thereof. The present invention includes a pneumatic tank being connected to a pneumatic motor; and a gas generating means being in fluid communication with the pneumatic tank to generate pressurized gas for actuating the pneumatic motor. None of the prior art includes the combination of the elements of the present invention.

There has thus been outlined, rather broadly, the more important features of the pneumatic charging system and method in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new pneumatic charging system which has many of the advantages of the gas generators mentioned heretofore and many novel features that result in a new pneumatic charging system and method which is not anticipated, rendered obvious, suggested, or even implied by any of the prior art gas generators, either alone or in any combination thereof.

Still another object of the present invention is to provide a new pneumatic charging system and method for conveniently and quickly re-pressurizing at selected pressures air tanks used to actuate pneumatic motors.

Still yet another object of the present invention is to provide a new pneumatic charging system and method that automatically refuels pneumatic tanks depending upon the level of pressurized gas in the pneumatic tanks.

Even still another object of the present invention is to provide a new pneumatic charging system and method that is monitored by a microprocessor and further includes replaceable containers containing explosive materials for creating pressurized gas for use to drive pneumatic motors with amounts from the containers being controlled by the microprocessor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic diagram of a third embodiment of a new pneumatic charging system and method according to the present invention.

DESCRIPTION OF THE PREFERRED EMBODIMENT

Figure 1:
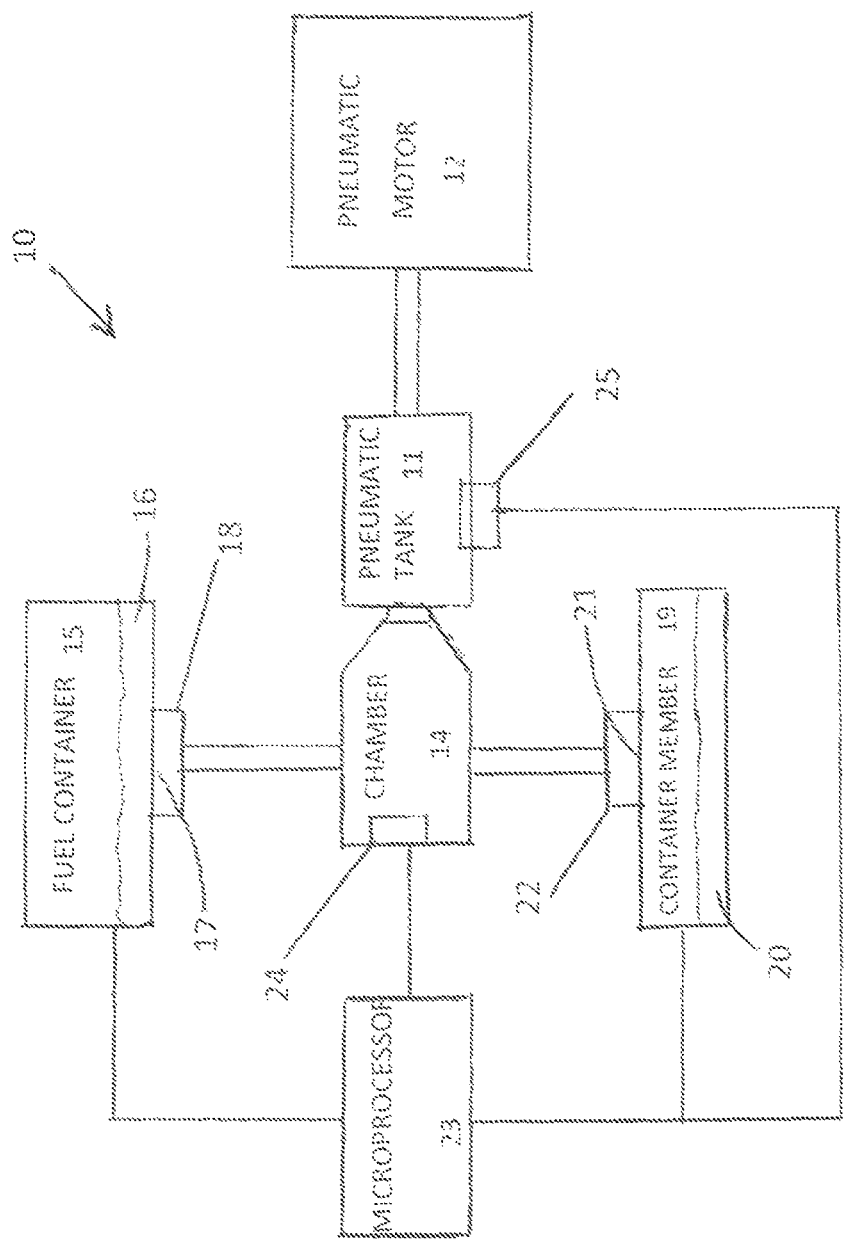
FIG. 1 is a schematic diagram of a new pneumatic charging system and method according to the present invention.
Figure 2:
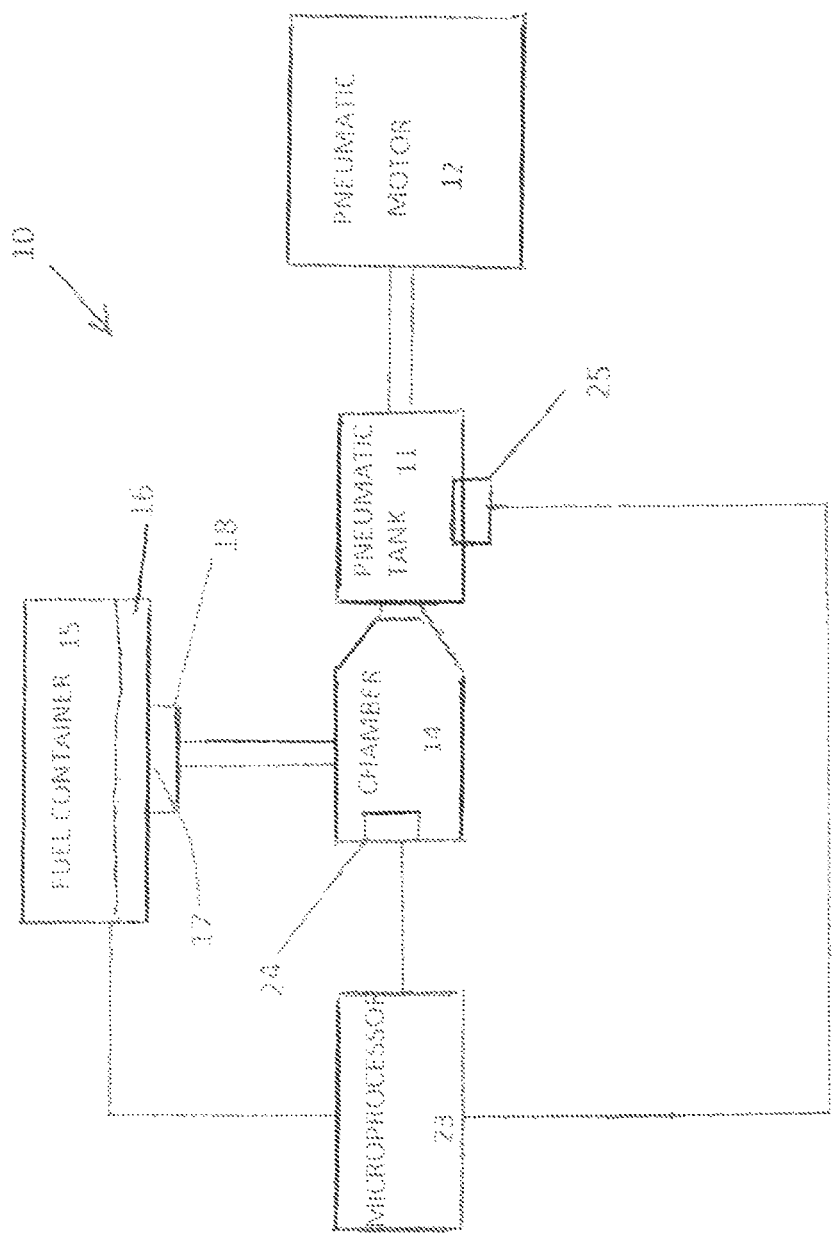
FIG. 2 is a schematic diagram of a second embodiment of a new pneumatic charging system and method according to the present invention.

With reference now to the drawings, and in particular to FIGS. 1 thru 3 thereof, a new pneumatic charging system and method embodying the principles and concepts of the present invention and generally designated by the reference numeral 10 will be described.

As best illustrated in FIGS. 1 thru 3, the pneumatic charging system and method 10 generally comprises a pneumatic tank 11 being conventionally connected to a pneumatic motor 12; and also comprises a gas generating assembly being in fluid communication with the pneumatic tank 11 to generate pressurized gas such as air used for actuating the pneumatic motor 12. The gas generating assembly includes a gas generating chamber 14 being in fluid communication with and conventionally connected to the pneumatic tank 11. The gas generating assembly also includes a fuel container 15 being replaceably and conventionally connected with a conduit to and being in fluid communication with the gas generating chamber 14 and further containing a substance 16 for generating pressurized gas. The fuel container 15 has a port 17 through which the substance 16 can enter and exit the fuel container 15. The substance 16 may include hydrogen, propane, nitrogen or any other volatile gases and solids such as gun powder.

The gas generating assembly further includes a microprocessor 23 being conventionally connected with wires to and being in operable communication with the gas generating chamber 14 and the fuel container 15 and being programmed to allow a selected amount of the substance 16 to exit from the fuel container 15 and to enter the gas generating chamber 14 in response to a predetermined condition such as the amount of pressurized gas in the pneumatic tank 11 being at a particular level. The gas generating assembly also includes a first valve 18 such as a conventional injector valve being conventionally disposed over the port 17 of the fuel container 15 and being in operable communication with the microprocessor 23 via wiring to allow the injection of a selected amount of the substance 16 into the gas generating chamber 15 from the fuel container 15 in response to the predetermined condition and upon the microprocessor 23 actuating the first valve 18. The gas generating assembly further includes a sensor 25 being conventionally disposed in the pneumatic tank 11 and being in operable communication with the microprocessor 23 via wiring to determine the remaining amount of pressurized gas in the pneumatic tank 11. As shown in FIG. 2, the substance 16 includes a liquid which creates a pressurized gas upon being injected into the gas generating chamber 14 and the liquid may be nitrogen.

As shown in FIG. 1 the gas generating assembly includes a fuel igniter 24 such as a battery-operated electrical component including a spark plug which is conventionally disposed in the gas generating chamber 14 and which is in operable communication with the microprocessor 23 via wiring for igniting the selected amount of the substance 16 being an explosive fuel such as hydrogen and propane in the gas generating chamber 14 thus causing pressurized gas which passes into and refuels the pneumatic tank 11 due to the force of the explosion and the pressure differences between the gas generating chamber 14 and the pneumatic tank 11. The gas generating assembly further includes a container member 19 being conventionally connected with a conduit to the gas generating chamber 14 and being conventionally connected with wiring to the microprocessor 23 and containing an accelerant 20 such as oxygen and also having a port 21 through which the accelerant 20 exits the container member 19 for intensifying the effects of the explosion of the explosive fuel 16 in the gas generating chamber 14 thus generating a greater volume of pressurized gas. The gas generating assembly also includes a second valve 22 being conventionally disposed over the pert 21 in the container member 19 and being in operable communication with the microprocessor 23 via wiring and being opened and closed by the microprocessor 23 to inject a selected amount of the accelerant 20 into the gas generating chamber 14 in response to a predetermined condition as cited above.

As shown in FIG. 3, the substance 16 can also be an explosive substance including gun powder and possibly a primer which are replaceably disposed in the gas generating chamber 14, and also includes a conventional igniter member 26 such as a solenoid being disposed in the gas generating chamber 14 and being connected with wires to the microprocessor 23 and functioning as a hammer and firing pin to strike the primer to explode the explosive substance thus creating the pressurized gas used to energize the pneumatic motor 12 in response to a predetermined condition.

In use, the sensor 25 transmits signals to the microprocessor 23 as to the amount of pressurized gas or air in the pneumatic tank 11 and when the air reaches a selected level, the microprocessor 23 as programmed actuates the first value 18 to inject a selected amount of substance 16 from the fuel container 15 into the gas generating chamber 14. If the substance 16 is liquid nitrogen, pressurized gas is immediately generated upon the liquid nitrogen being injected into the gas generating chamber 14. If the substance 16 is an explosive fuel such as hydrogen or propane, an accelerant 20 can be added to the gas generating chamber 14 to greatly intensify any explosion. The second valve 22 is actuated by the microprocessor 23 to inject a selected amount of the accelerant 20 from the container member 19 into the gas generating chamber 14 with the microprocessor 23 also actuating the fuel igniter 24 whereupon, an explosive reaction occurs in the gas generating chamber 14 thus creating pressurized gas or air at a predetermined pounds per square inch with the pressurized air passing through a conventional one-way valve which is conventionally connected to the pneumatic tank 11, and with the pressurized air passing into and refueling the pneumatic tank 11 due to the explosive force and to the pressure differences in the gas generating chamber 14 and the pneumatic tank 11. The pressurized gas or air in the pneumatic tank 11 is then used to drive or energize the pneumatic motor 12. This process repeats itself when the pressurized gas in the pneumatic tank 11 reaches a predetermined level. The user can easily remove and replace the fuel container 15 and the container member 19 upon both being emptied. Further, as shown in FIG. 3, the substance 16 which is an explosive substance including gun powder and possibly a primer can be removably and conventionally disposed into the gas generating chamber 14 with the gun powder being ignited using a conventional igniter member 26 whereupon there is an explosive reaction thus resulting in the creation of the pressurized gas with the igniter member 26 being in operable and conventional communication via wiring with the microprocessor 23 which is programmed to actuate the igniter member 26 in response to a predetermined condition.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the pneumatic charging system and method. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pneumatic charging system comprising:
   a pneumatic tank being connected to a pneumatic motor; and a gas generating assembly including a gas generating chamber being in fluid communication with said pneumatic tank to generate pressurized gas for actuating the pneumatic motor, wherein said gas generating assembly includes a microprocessor being in operable communication with said gas generating chamber and being programmed to facilitate the creation of pressurized gas in response to a predetermined condition including the remaining amount of pressurized gas in said pneumatic tank.

2. The pneumatic charging system as described in claim 1, wherein said gas generating assembly further includes a sensor being in operable communication with said pneumatic tank and said microprocessor so as to indicate the amount of pressurized gas in said pneumatic tank.

3. The pneumatic charging system as described in claim 2, wherein said gas generating assembly also includes a fuel container being in fluid and replaceable communication with said gas generating chamber and further containing a substance for generating pressurized gas, said fuel container having a port through which the substance can enter and exit said fuel container.

4. The pneumatic charging system as described in claim 3, wherein said gas generating assembly also includes a first valve being disposed over said port of said fuel container and being in operable communication with and actuable by said microprocessor to allow the injection of a selected amount of the substance into said gas generating chamber from said fuel container in response to the predetermined condition.

5. The pneumatic charging system as described in claim 4, wherein said substance includes a liquid which creates a pressurized gas upon being injected into said gas generating chamber, said liquid being nitrogen.

6. The pneumatic charging system as described in claim 4, wherein said substance is an explosive fuel, said gas generating assembly also including a fuel igniter being in operable communication with said gas generating chamber and said microprocessor for igniting the selected amount of the explosive fuel in said gas generating chamber thus causing pressurized gas which passes into and refuels said pneumatic tank due to the force of the explosion.

7. The pneumatic charging system as described in claim 6, wherein said gas generating assembly further includes a container member being in communication to said gas generating chamber and to said microprocessor and storing an accelerant and also baying a port through which the accelerant exits said container member for intensifying the effects of the explosion of the explosive fuel in said gas generating chamber.

8. The pneumatic charging system as described in claim 7, wherein said gas generating assembly also includes a second valve being disposed over said port in said container member and being in operable communication with said microprocessor and being opened and closed by said microprocessor to inject a selected amount of the accelerant into said gas generating chamber in response to the predetermined condition.

9. The pneumatic charging system as described in claim 2, wherein said gas generating assembly further includes an explosive substance including gun powder being replaceably disposed in said gas generating chamber, and also includes an igniter member being in operable communication with said explosive substance and with said microprocessor; wherein in response to the predetermined condition, said microprocessor actuates said igniter member to explode said explosive substance thus creating the pressurized gas used to energize the pneumatic motor.

10. The method of generating pressurized gas to fuel a pneumatic tank to actuate a pneumatic motor comprising the steps of:
providing a pneumatic tank and a gas generating chamber being in fluid communication with the pneumatic tank;
effecting a pressurized gas in the gas generating chamber and replaceably connecting a fuel container containing a substance to the gas generating chamber and injecting the substance into the as generating chamber; and
fueling the pneumatic tank with the pressurized gas which is used to actuate a pneumatic motor.

11. The method of generating pressurized gas to fuel a pneumatic tank to actuate a pneumatic motor as described in claim 10 includes providing a microprocessor which is in operable communication with the fuel container and which is programmed to inject selected amounts of the substance into the gas generating chamber in response to a predetermined condition.

12. The method of generating pressurized gas to fuel a pneumatic tank to actuate a pneumatic motor as described in claim 11 wherein the substance is an explosive fuel.

13. The method of generating pressurized gas to fuel a pneumatic tank to actuate a pneumatic motor as described in claim 12 also includes replaceably connecting a container member containing an accelerant to the gas generating chamber with the container member being in operable communication with the microprocessor.

14. The method of generating pressurized gas to fuel a pneumatic tank to actuate a pneumatic motor as described in claim 13 further includes combining the accelerant and the explosive fuel into the gas generating chamber and igniting the combined explosive fuel and the accelerant with the microprocessor in response to the predetermined condition to create be pressurized gas.

15. The method of generating pressurized gas to fuel a pneumatic tank to actuate a pneumatic motor as described in claim 14 also includes providing a fuel igniter being in operable communication with the gas generating chamber and with the microprocessor and in concert with the microprocessor, igniting the explosive fuel and the accelerant and causing an explosive reaction thus resulting in the pressurized gas.

16. The method of generating pressurized gas to fuel a pneumatic tank to actuate a pneumatic motor as described in claim 10 includes moving the pressurized gas from the gas generating chamber into the pneumatic tank.

17. A method of generating pressurized gas to fuel a pneumatic tank to actuate a pneumatic motor comprising the steps of:
providing a pneumatic tank and a gas generating chamber being in fluid communication with the pneumatic tank;
effecting a pressurized gas in the gas generating chamber upon
replaceably disposing an explosive substance including gun powder into the gas generating chamber; and
fueling pneumatic tank with the pressurized gas which is used to actuate a pneumatic motor,
replaceably disposing an explosive substance including gun powder into the gas generating chamber.

18. The method of generating pressurized gas to fuel a pneumatic tank to actuate a pneumatic motor as described in claim 17 includes igniting the explosive substance using an igniter member which is in operable communication with a microprocessor; wherein the microprocessor is programmed to actuate the igniter member in response to a predetermined condition.

* * * * *